United States Patent

Miyazaki

[11] Patent Number: 5,274,440
[45] Date of Patent: Dec. 28, 1993

[54] AUTOMATIC WHITE BALANCE CONTROL APPARATUS CAPABLE OF PERFORMING WHITE BALANCE WITH A SUBJECT OF A MONOCHROMATIC COLOR OTHER THAN WHITE

[75] Inventor: Akihiko Miyazaki, Tokyo, Japan

[73] Assignee: U.S. Philips Corporation, New York, N.Y.

[21] Appl. No.: 957,579

[22] Filed: Oct. 5, 1992

[30] Foreign Application Priority Data

Oct. 4, 1991 [JP] Japan ................... 3-284045

[51] Int. Cl.⁵ .................. H04N 9/73; H04N 9/04; H04N 9/64
[52] U.S. Cl. .................. 358/29; 358/41
[58] Field of Search ........... 358/29 C, 29, 41–44, 358/50, 909, 60

[56] References Cited

U.S. PATENT DOCUMENTS

| | | | |
|---|---|---|---|
| 4,602,277 | 7/1986 | Guichard | 358/29 |
| 4,922,330 | 5/1990 | Saito et al. | 358/29 |
| 5,021,875 | 6/1991 | Iida et al. | 358/29 C |
| 5,099,316 | 3/1992 | Ogawa | 358/41 |
| 5,170,247 | 12/1992 | Takagi et al. | 358/29 C |
| 5,198,890 | 3/1993 | Suga | 358/29 C |

FOREIGN PATENT DOCUMENTS 0429992 6/1991 European Pat. Off. .
0433672 6/1991 European Pat. Off. .
60-74892 4/1985 Japan .
60-074892 4/1985 Japan .

Primary Examiner—James J. Groody
Assistant Examiner—Safet Metjahic
Attorney, Agent, or Firm—Edward W. Goodman

[57] ABSTRACT

In an automatic white balance control apparatus which is less sensitive to a monochromic subject, color difference signals R−Y and B−Y are converted into digital values by A/D converters (20, 21). A quadrant determination circuit (22) determines for each digital color difference value to which quadrant of a two-dimensional coordinate system with an ordinate representing (R−Y) and an abscissa representing (B−Y) it belongs. Digital color difference values within one field are accumulated by accumulation device (28, 29, 30) per each quadrant. With respect to the digital color difference values (R−Y) wig& one field, digital difference values of pairs each one sampling period apart from each other are accumulated per each quadrant. The above two kinds of accumulations are carried out also with respect to the digital color difference values (B−Y) within one field. When the accumulated values of the two color difference values (R−Y) and (B−Y) within the respective quadrants are compared to control gains for R−Y and B−Y by a microprocessor (31), the accumulated value of the color differences in the quadrant, of which accumulated value of the digital difference values is small, is given a small weight.

6 Claims, 2 Drawing Sheets

AUTOMATIC WHITE BALANCE CONTROL APPARATUS CAPABLE OF PERFORMING WHITE BALANCE WITH A SUBJECT OF A MONOCHROMATIC COLOR OTHER THAN WHITE

BACKGROUND OF THE INVENTION

1. Field of the Invention

The invention relates to an automatic white balance control apparatus for use in a camera apparatus such as a video camera.

2. Description of the Related Art

There have conventionally been proposed various types of automatic white balance control apparatuses for use in video cameras or the like. For example, Japanese Patent Application Laid-Open No. JP-A 60-74892 discloses an automatic white balance control apparatus which converts two color difference signals R−Y and B−Y into digital values to store in a memory, calculates average values of these digital values stored with regard to the respective color difference signals, and controls gains corresponding, respectively, to the red and blue color signals such that the above average values become equal to predetermined reference values, respectively.

However, an automatic white balance control apparatus of the above-described type suffers from the following disadvantage. When there is a subject of a monochromatic color other than white in the taken picture, the color of this subject fades. This is because the color information of this monochromatic subject is used also as information for the white balance control.

SUMMARY OF THE INVENTION

Therefore, it is an object of the present invention to provide an automatic white balance control apparatus which can carry out an appropriate automatic white balance control even for a picture including a monochromatic subject.

It is another object of the present invention to provide an automatic white balance control apparatus of the above type which can yet be realized with a relatively simple structure.

To this end, the invention provides an automatic white balance control apparatus, characterized in that it comprises analog-to-digital conversion means for successively sampling each of two color information components contained in a video signal and for converting each sampled component into digital color information data; quadrant determination means for determining to which quadrant of a coordinate system coordinates defined by the two color information components at a current sampling instant belong, the coordinate system being two-dimensional and having coordinate axes corresponding, respectively, to said two color information components, said quadrant determination means generating a quadrant signal representative of the determined quadrant; difference forming means for forming, with respect to each of the two color information components, difference data between color information data at the current sampling instant and the color information data at an instant which is shifted a predetermined number of samples from said current sampling instant; accumulation means for accumulating, over the video signal corresponding to at least one picture, each of the two color information data and the two difference data with regard to each quadrant of said coordinate system in accordance with said quadrant signal; data processing means for comparing, with respect to each of the two color information components, the accumulated values of the color information data in the respective quadrants of said coordinate system with each other after applying, respectively, thereto weights which are dependent on the accumulated values of the difference data relative to the corresponding color information data in the respective quadrants, and for generating a control signal which is dependent on the result of the comparison; and gain control means responsive to the control signals corresponding, respectively, to the two color information components for controlling gains for these color information components.

With the above structure, since the color in formation relative to a monochromatic subject can be obtained as an accumulated value of the difference data, an effect of the color information of the monochromatic subject on the color information to be used for the white balance control can be reduced by applying a weight dependent on the accumulated value of the difference data to the accumulated value of the color information data, whereby it is possible to accomplish a more appropriate white balance control than that in the conventional apparatus.

In the above case, it is preferable that the weight given according to the accumulated value of the difference data be smaller as this accumulated value of the difference data becomes smaller.

These and other aspects of the invention will be apparent from and elucidated with reference to the embodiments described hereinafter.

DESCRIPTION OF THE PREFERRED EMBODIMENTS

Figure 1:
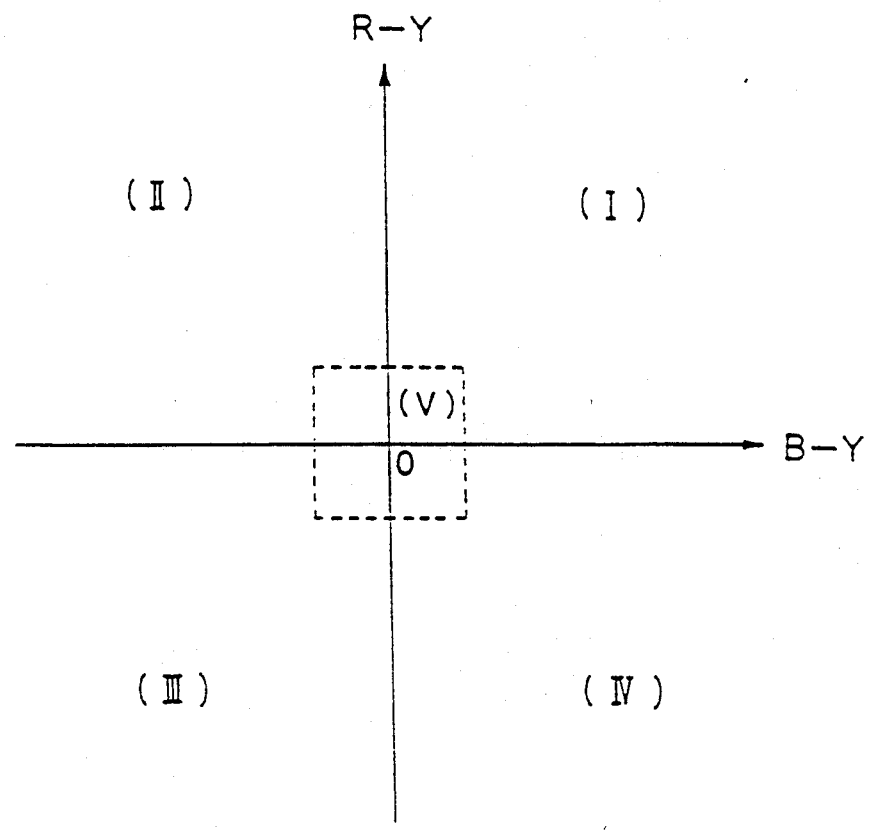
FIG. 1 is a two-dimensional coordinate system used for explaining the principle of the automatic white balance control apparatus according to the present invention.

First, the principle of the present invention will be described with reference to FIG. 1. FIG. 1 is a two-dimensional coordinate system which has an ordinate and an abscissa corresponding to the color components R−Y and B−Y of picture information, respectively. According to this invention, it is examined how sample values of the R−Y and B−Y color difference components of an entire picture which was taken are distributed on the coordinate system of FIG. 1, and then the sum of the sample values distributed in each quadrant of this coordinate system is calculated with respect to each of the R−Y and B−Y color difference components. Furthermore, with respect to each of the R−Y color difference components and the B−Y color difference components distributed in each quadrant, a sum of differences (absolute values) between a respective one of the sample values and the value of the sample which is shifted therefrom by one sample period is calculated. Then, with respect to each of the R−Y color difference components and the B−Y color difference components, gains for the respective color difference components are controlled such that the sum of the total value of those sample values which are located on the positive side of the coordinate system and the total value of those sample values which are located on the negative side of the coordinate system approaches zero, wherein the total value of sample values in that quadrant whose sum of the differences is small is disregarded or used with a low weight.

The reason why the total value of sample values in the quadrant whose sum of the differences is small is disregarded or used with a low weight is that the greater part of the total value of the sample values in such a quadrant is of a monochromatic subject and is not therefore appropriate for the white balance control.

Figure 2:
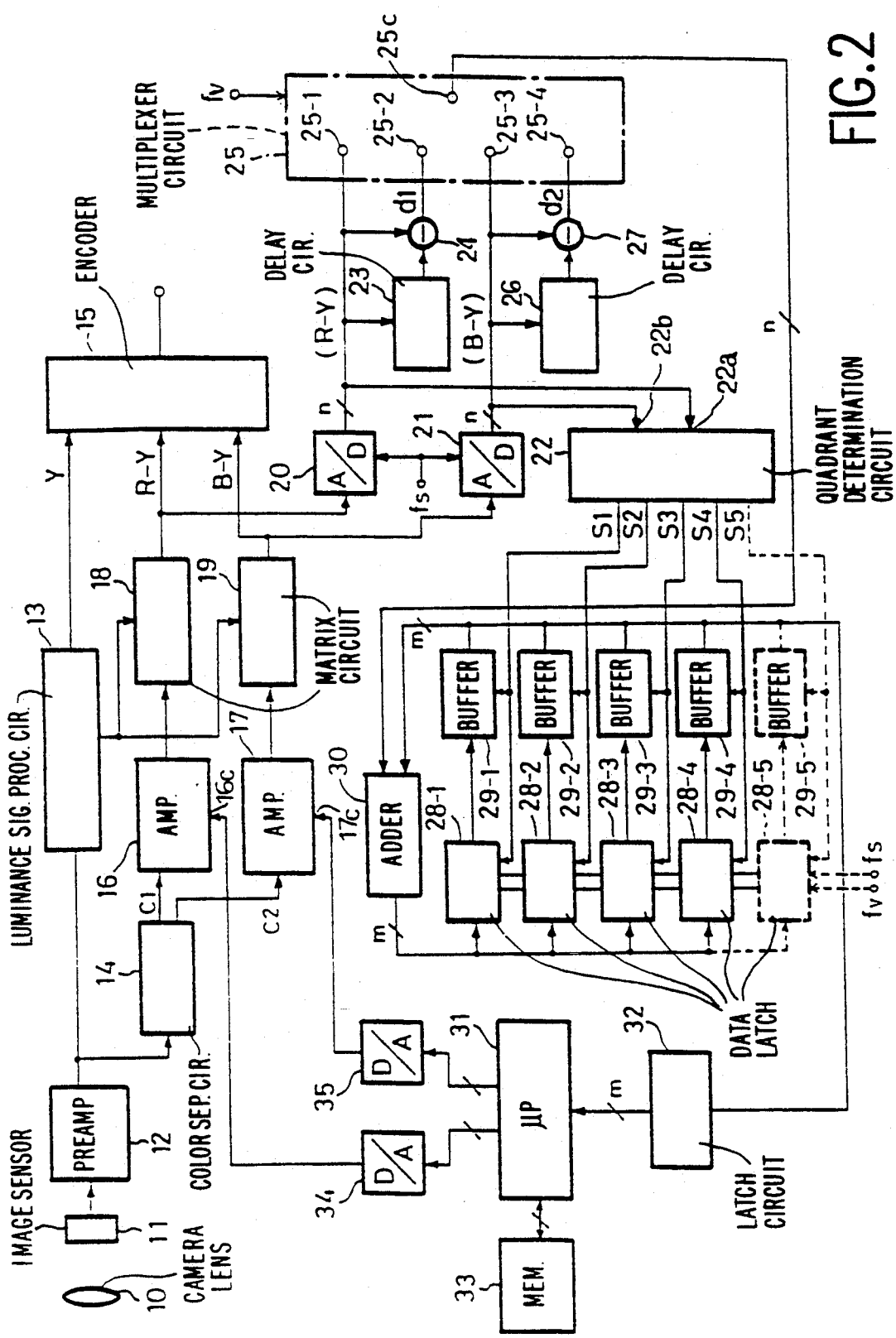
FIG. 2 is a block diagram showing a structure of one embodiment of the automatic white balance control apparatus according to the invention which is applied to a video camera.

FIG. 2 is a block diagram showing the structure of an embodiment of the automatic white balance control apparatus according to the invention which is applied to a video camera. In FIG. 2, optical picture information obtained through a camera lens 10 is converted by an image sensor 11 composed, for example, of a CCD into a corresponding electric picture signal. This picture signal is amplified by a preamplifier 12 and then supplied to a luminance signal processing circuit 13 and to a color separation circuit 14. The luminance signal processing circuit 13 derives a luminance component of the picture signal and subjects this luminance component to a predetermined processing to form a luminance signal Y which is supplied to an encoder 15 of the known structure.

The color separation circuit 14 derives two color signals C1 and C2 from the picture signal and supplies these signals to gain controllable amplifiers 16 and 17, respectively. The amplifiers 16 and 17 amplify the color signals C1 and C2, corresponding respectively to red and blue, at respective gain factors which are dependent on signals applied to control terminals 16c and 17c thereof and supply these amplified signals to matrix circuits 18 and 19, respectively. The matrix circuits 18 and 19 form, based on the supplied signals and an output from the luminance signal processing circuit 13, color difference signals $R-Y$ and $B-Y$ of the picture signal. The encoder 15 produces a color video signal from the color difference signals $R-Y$ and $B-Y$ and the aforesaid luminance signal Y, which video signal is supplied to not-shown various portions of this video camera.

The structure of the above-described circuit portions is known and will not be described further in detail.

The color difference signals $R-Y$ and $B-Y$ are converted by analog-to-digital (A/D) converters 20 and 21 at a predetermined sampling frequency fs into digital values $(R-Y)$ and $(B-Y)$ each, for example, of n bits, respectively. The digital color difference value $(R-Y)$ is supplied to a first input terminal 22a of a quadrant determination circuit 22, to an input terminal of a delay circuit 23 having a delay time of one sample period, to one input terminal of a difference former 24, and to a first input terminal 25-1 of a multiplexer circuit 25. The difference former 24 forms a difference (in absolute value) between the current digital color difference value $(R-Y)$ and the digital color difference value $(R-Y)$ which is one sample period earlier and applied to the other input terminal thereof and supplies this difference d1 to a second input terminal 25-2 of the multiplexer circuit 25. Such a difference former can easily be constructed by combining known subtracter and absolute-value circuits. The digital color difference value $(B-Y)$ is supplied to a second input terminal 22b of the quadrant determination circuit 22, to an input terminal of a delay circuit 26 having a delay time of one sample period, to one input terminal of a difference former 27, and to a third input terminal 25-3 of the multiplexer circuit 25. The difference former 27 forms a difference (in absolute value) between the current digital color difference value $(B-Y)$ and the digital color difference value $(B-Y)$ which is one sample period earlier and applied to the other input terminal thereof and supplies this difference d2 to a fourth input terminal 25-4 of the multiplexer circuit 25. The multiplexer 25 connects the input terminals 25-1, 25-2, 25-3 and 25-4 sequentially and cyclically to an output terminal 25c thereof upon each lapse of one field period based, for example, on a vertical synchronization signal fv. The quadrant determination circuit 22 determines, based on the digital color difference values $(R-Y)$ and $(B-Y)$, to which quadrant of the coordinate system shown in FIG. 1 the coordinate defined by these values belongs and outputs a signal S1, S2, S3 or S4 which corresponds to the determined quadrant I, II, III or IV. Such a quadrant determination circuit can easily be constructed by arranging AND gates or the like to determine one of the four combinations of the sign bits of the input data although its detailed structure is not shown.

The signals S1 to S4 outputted from the quadrant determination circuit 22 are supplied respectively to enabling input terminals of data latch circuits 28-1 to 28-4 and to enabling input terminals of buffer circuits 29-1 to 29-4 which receives output data of the latch circuits. Output terminals of the buffer circuits 29-1 to 29-4 are connected to one input terminals of an adder 30, to the other input terminals of which the output terminal 25c of the multiplexer 25 is connected. Output terminals of the adder 30 are connected to input terminals of each of the latch circuits 28-1 to 28-4. Each loading terminal of the latch circuits 28-1 to 28-4 is supplied with a signal fs which is generated at the sampling interval. In this case, when the signal S1 is generated, for example, the buffer circuit 29-1 is enabled whereby the output of the latch circuit 28-1 is applied to the adder 30. At the same time, the m-bit output of this adder is loaded into the same latch circuit 28-1 by the signal fs, and as a result the output of the multiplexer 25 is added to the contents of the latch circuit 28-1. In a similar manner, when any one of the signals S2 to S4 is generated, the output of the multiplexer 25 is added to the contents of a corresponding one of the latch circuits 28. All the contents of the latch circuits 28-1 to 28-4 are cleared by the signal fv at the beginning of each field.

The buffer circuits 29-1 to 29-4 are sequentially enabled by timing signals (not shown) from a microprocessor 31 at the end of each field. During the enabled periods, the outputs of the buffer circuits are read into the microprocessor 31 through a latch circuit 32 and then stored in a memory 33 which is connected to this microprocessor. In this memory, various programs for control including a gain control, which will later be described, have previously been stored. The microprocessor 31 has output buses which are connected to digital-to-analog (D/A) converters 34 and 35 whose output terminals are connected to control input terminals of the aforesaid gain controllable amplifiers 16 and 17, respectively.

The operation of this automatic white balance control apparatus constructed as above will now be described.

When a shooting is being performed with this video camera, the digital color difference values $(R-Y)$ and $(B-Y)$ are sequentially outputted from the A/D converters 20 and 21 in each field period in accordance with the sampling signal fs. In response thereto, the quadrant determination circuit 22 outputs the signal S1, S2, S3 or S4 which indicates to which quadrant of the coordinate system each combination of these digital color difference values belongs. On the other hand, the input terminals 25-1 to 25-4 of the multiplexer 25 are changed over from one to the other in each field and connected to the output terminal 25c.

Assuming that the input terminal 25-1 of the multiplexer 25 is now selected in a given field period, the digital color difference values (R−Y) are sequentially supplied to the adder 30 in this field. Each of these color difference values (R−Y) is added to the contents of one of the latch circuits 28-1, 28-2, 28-3 and 284 in accordance with the signal S1, S2, S3 or S4 which is outputted from the quadrant determination circuit 22 at that sampling instant. For example, when the signal S3 is outputted from the quadrant determination circuit 22 at the current sampling instant, the color difference value (R−Y) at this sampling instant is added to the contents of the latch circuit 28-3. Thus, during the time when one field period lapses, all the digital color difference values (R−Y) within this one field are accumulated in the latch circuits 28-1 to 28-4 for the quadrants I to IV, respectively. These accumulated values are sequentially read by the microprocessor 31 from the latch circuits 28-1 to 28-4 at the end of the above field and stored in the memory 33.

When the next field starts, the latch circuits 28-1 to 28-4 are cleared by the signal fv and the input terminal 25-2 is now connected to the output terminal 25c in the multiplexer 25. As a result, the differences d1 of the digital color difference values (R−Y) are accumulated in the latch circuits 28-1 to 284 for the respective quadrants in this field in a manner similar to the above. In the similar manner, the digital color difference values (B−Y) are accumulated in the latch circuits 28-1 to 28-4 for the respective quadrants in the next field, and the differences d2 of the digital color difference values (B−Y) are accumulated for the respective quadrants in a field next to this field.

In this way, when a time period corresponding to four fields has lapsed, the accumulated values of the color difference values (R−Y), their differences d1, the color difference values (B−Y) and their differences d2 are obtained in the memory 33 for the respective quadrants.

The microprocessor 31 then controls the gains of the amplifiers 16 and 17 in accordance with the above-described accumulated values so that the optimum white balance is obtained. More specifically, the microprocessor 31 first reads the accumulated values of the color difference values (R−Y) of the respective quadrants from the memory 33 and gives these accumulated values predetermined weights. These weights are smaller for the quadrants I and III and larger for the quadrants II and IV. The reason for this is that the color difference information in the quadrants II and IV is the most important for the white balance control. Then, the microprocessor 31 reads the respective accumulated values of the differences d1 relative to the color difference values (R−Y) from the memory 33 and determines whether each of these accumulated values is smaller than a predetermined threshold value. With regard to the quadrant for which it has been determined that the accumulated value is smaller than the threshold value, the weight given to the accumulated value of the color difference values (R−Y) is decreased or this accumulated value is deemed as zero. The microprocessor 31 then compares the positive-side ones and the negative-side ones of the accumulated values of the color difference values (R−Y) of the respective quadrants to which the weights have been given in the above manner, and controls the gain of the amplifier 16 based on this comparison result. More specifically, the microprocessor 31 compares the sum of the accumulated values of the color difference values (R−Y) of the quadrants I and II with that of the color difference values (R−Y) of the quadrants III and IV. When the former sum is greater, the microprocessor 31 outputs to the D/A converter 34 a value, which is smaller than the current value by an amount corresponding to the difference between these sums, to thereby lower the gain of the amplifier 16. The microprocessor 31 causes the gain of the amplifier 16 to increase in the case opposite to the above.

The microprocessor 31 performs controls similar to the above also with respect to the accumulated value of the color difference values (B−Y) and the accumulated value of the differences d2 relative to the color difference values (B−Y). More specifically, the value supplied to D/A converter 35 is varied based on a comparison of the sum of the accumulated values of the color difference values (B−Y) of the quadrants I and IV, to which the predetermined weights or the weights determined from the accumulated value of the differences d2 are given, with the sum of those of the quadrants III and M to thereby control the gain of the amplifier 17.

The control of the gains of the amplifiers 16 and 17 in the abovedescribed manner is continuously carried out at a cycle of four fields, whereby the white balance is always kept in the optimum condition.

The above embodiment may be modified such that the respective accumulated values of the color difference values (R−Y) and (B−Y) are calculated with regard to an area V indicated by a broken line in FIG. 1 in the vicinity of the center of the coordinate system, and that when the accumulated value in this area V is significantly greater than those in the other areas, it is determined that the white balance is good and the gains of the amplifiers 16 and 17 are not changed. In this case, the quadrant determination circuit 22 may further be arranged as indicated by broken lines in FIG. 2 such that it further outputs a signal S5 when the color difference values (R−Y) and (B−Y) are located within the area V. Such a signal S5 can easily be produced by providing comparators for comparing absolute values of the color difference values (R−Y) and (B−Y) with predetermined values, respectively, and an AND gate for obtaining a product of outputs of these comparators. Then, the circuit of FIG. 2 is provided further with a latch circuit 28-5 and a buffer circuit 29-5 which are enabled by the signal S5. Furthermore, the microprocessor 31 may be programmed such that when the accumulated values of the color difference values (R−Y) and (B−Y) read from the latch circuit 28-5 are significantly greater than those read from the other latch circuits, the output values to the D/A converters 34 and 35 are kept as they are.

In the above-described embodiment, the accumulated values of the (R−Y), d1, (B−Y) and d2 are calculated at a cycle of four fields. However, such accumulated values may be calculated at a cycle of four frames or a cycle having interval longer than this. In the case where a circuit of more complicated structure is acceptable, all the four accumulated values may be calculated within one field.

When giving, based on the accumulated values of the differences d1 and d2, further weights to the accumulated values of the color difference values (R−Y) and (B−Y) of the respective quadrants to which the predetermined weights have been given, these further weights may not only be determined in the above-described way, in which the determination is made based on the result of the comparison of the accumulated value of differences with the predetermined threshold value, but may also be determined, for example, as being proportional to the accumulated value of the differences with a certain relation.

The invention thus provides an automatic white balance control apparatus in which an effect of a monochromatic subject is reduced. Color difference signals R−Y and B−Y are sampled at a predetermined frequency and converted into digital values by A/D converters 20, 21. A quadrant determination circuit 22 determines for each digital color difference value to which quadrant of a two-dimensional coordinate system with an ordinate representing (R−Y) and an abscissa representing (B−Y) it belongs. Digital color difference values within one field are accumulated by accumulation means 28, 29, 30 per each quadrant. With respect to the digital color difference values (R−Y) within one field, digital difference values of pairs each one sampling period apart from each other are accumulated per each quadrant. The above two kinds of accumulations are carried out also with respect to the digital color difference values (B−Y) within one field. When the accumulated values of the two color difference values (R−Y) and (B−Y) within the respective quadrants are compared to control gains for R−Y and B−Y by a microprocessor 31, the accumulated value of the color differences in the quadrant, of which accumulated value of the digital difference values is small, is given a small weight.

It should be noted that the above-mentioned embodiments illustrate rather than limit the invention, and that those skilled in the art win be able to design many alternative embodiments, without departing from the scope of the appended claims.

List of Reference Numerals

- 10: camera lens
- 11: image sensor
- 12: preamplifier
- 13: luminance signal processing circuit
- 14: color separation circuit
- 15: encoder
- 16 and 17: gain-controlled amplifiers
- 18 and 19: matrix circuits
- 20 and 21: A/D converters
- 22: quadrant determination circuit
- 23: delay circuit
- 24: difference former
- 25: multiplexer
- 26: delay circuit
- 27: difference former
- 28: data latch circuit
- 29: buffer circuit
- 30: adder
- 31: microprocessor
- 32: latch circuit
- 33: memory
- 34 and 35: D/A converters.

I claim:

1. An automatic white balance control apparatus characterized by comprising:

analog-to-digital conversion means for successively sampling each of two color information components contained in a video signal and for converting each sampled component into digital color information data;

quadrant determination means for determining to which quadrant of a coordinate system coordinates defined by the two color information components at a current sampling instant belong, the coordinate system being two-dimensional and having coordinate axes corresponding respectively to said two color information components, said quadrant determination means generating a quadrant signal representative of the determined quadrant;

difference forming means for forming, with respect to each of the two color information components, difference data between color information data at the current sampling instant and the color information data at an instant which is shifted a predetermined number of samples from said current sampling instant;

accumulation means for accumulating, over the video signal corresponding to at least one picture, each of the two color information data and the two difference data with regard to each quadrant of said coordinate system in accordance with said quadrant signal;

data processing means for comparing, with respect to each of the two color information components, the accumulated values of the color information data in the respective quadrants of said coordinate system with each other after applying respectively thereto weights which are dependent on the accumulated values of the difference data relative to the corresponding color information data in the respective quadrants, and for generating a control signal which is dependent on result of the comparison; and gain control means responsive to the control signals corresponding respectively to the two color information components for controlling gains for these color information components.

2. An automatic white balance control apparatus as claimed in claim 1, characterized in that the application of said weights by said data processing means is carried out in such a manner that the smaller the accumulated value of the difference data in a quadrant is the smaller the weight given to the accumulated value of the color information data in the same quadrant is.

3. An automatic white balance control apparatus as claimed in claim 1, characterized in that said data processing means give, with respect to each of the two color information components, greater weights to the respective accumulated values of the color information data in the second and fourth quadrants than to those in the first and third quadrants.

4. An automatic white balance control apparatus as claimed in claim 1, characterized in that the two color information components correspond to an R−Y color difference signal and a B−Y color difference signal, respectively.

5. An automatic white balance control apparatus as claimed in claim 1, characterized in that said difference forming means form, with respect to each of the two color information components, difference data between color information data at the current sampling instant and the color information data one sampling period before or after said instant.

6. An automatic white balance control apparatus as claimed in claim 1, characterized in that said accumulation means obtain all the accumulated values of the two color information data and the two difference data of one entire picture within a period of four fields.

* * * * *